(12) United States Patent
Shaffer et al.

(10) Patent No.: US 9,088,179 B2
(45) Date of Patent: Jul. 21, 2015

(54) ADAPTIVE CONTROL OF POWER GRID OPERATIONS BASED ON ENERGY PROFILES

(75) Inventors: Shmuel Shaffer, Palo Alto, CA (US); Paul Bernard Duffy, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 442 days.

(21) Appl. No.: 13/214,771

(22) Filed: Aug. 22, 2011

(65) Prior Publication Data
US 2013/0054044 A1 Feb. 28, 2013

(51) Int. Cl.
*H02J 13/00* (2006.01)
*H02J 3/14* (2006.01)

(52) U.S. Cl.
CPC ............... *H02J 3/14* (2013.01); *H02J 13/0079* (2013.01); *Y02B 70/3225* (2013.01); *Y02E 60/74* (2013.01); *Y04S 10/30* (2013.01); *Y04S 20/222* (2013.01)

(58) Field of Classification Search
CPC ......... G05D 5/00; G05D 11/00; G05D 19/00; G05D 23/19; G06F 1/39; G06F 1/30; G06F 1/28; G06F 1/26; G06F 15/16; H02J 3/14; H02J 13/0079; H02J 2003/143; Y02B 70/3225; Y02E 60/74; Y04S 10/30; Y04S 20/222
USPC ........................ 700/291, 295, 296, 286, 297
See application file for complete search history.

(56) References Cited

U.S. PATENT DOCUMENTS

| | | | |
|---|---|---|---|
| 5,572,438 A * | 11/1996 | Ehlers et al. | 700/295 |
| 7,472,290 B2 | 12/2008 | Diab et al. | |
| 7,903,597 B2 | 3/2011 | Biederman et al. | |
| 8,204,633 B2 * | 6/2012 | Harbin et al. | 700/295 |
| 8,866,323 B2 * | 10/2014 | Nielsen | 290/44 |
| 2002/0118101 A1 * | 8/2002 | Kline | 340/310.01 |
| 2006/0259199 A1 * | 11/2006 | Gjerde et al. | 700/284 |

(Continued)

FOREIGN PATENT DOCUMENTS

WO WO 2011098873 A2 * 8/2011

OTHER PUBLICATIONS

Ipakchi et al., "Grid of the Future; Are We Ready to Transition to a Smart Grid?", IEEE Power & Energy Magazine Mar./Apr. 2009, pp. 52-62.

(Continued)

*Primary Examiner* — Robert Fennema
*Assistant Examiner* — Jennifer L Norton
(74) *Attorney, Agent, or Firm* — Parker Ibrahim & Berg LLC; James M. Behmke; Stephen D. LeBarron

(57) ABSTRACT

In one embodiment, an energy manager determines respective energy profiles of one or more local end-devices for which the energy manager is responsible. Through communication between a power grid controller and the energy manager, one or more aspects of power grid operations may be controlled based on the communicating and the respective energy profiles. For example, in one embodiment, upon receiving a global demand response (DR) request, the energy manager determines respective specific DR control for the one or more local end-devices based on the received DR request and the respective energy profiles, and transmits the respective specific DR control to the one or more local end-devices, accordingly. In another embodiment, power grid operations may be stabilized based on the respective energy profiles.

22 Claims, 9 Drawing Sheets

(56) References Cited

U.S. PATENT DOCUMENTS

| | | | |
|---|---|---|---|
| 2007/0010916 A1* | 1/2007 | Rodgers et al. | 700/295 |
| 2008/0177678 A1* | 7/2008 | Di Martini et al. | 705/412 |
| 2008/0296973 A1* | 12/2008 | Ito et al. | 307/65 |
| 2009/0052372 A1 | 2/2009 | Durazzo et al. | |
| 2009/0219145 A1 | 9/2009 | Wong et al. | |
| 2009/0319091 A1* | 12/2009 | Flohr | 700/295 |
| 2010/0004790 A1* | 1/2010 | Harbin et al. | 700/291 |
| 2010/0017045 A1* | 1/2010 | Nesler et al. | 700/296 |
| 2010/0042855 A1 | 2/2010 | Karam | |
| 2010/0217452 A1* | 8/2010 | McCord et al. | 700/295 |
| 2011/0046806 A1* | 2/2011 | Nagel et al. | 700/291 |
| 2011/0066300 A1* | 3/2011 | Tyagi et al. | 700/291 |
| 2012/0046797 A1* | 2/2012 | Grohman | 700/296 |
| 2012/0063334 A1* | 3/2012 | Drake | 370/252 |
| 2012/0158198 A1* | 6/2012 | Black et al. | 700/291 |

OTHER PUBLICATIONS

I. Rowlands, "Demand Response in Ontario: Exploring the Issues," A report prepared for the Independent Electricity System Operator (IESO), Toronto, Ontario, Aug. 26, 2008, pp. 1-40.

J. Medina, "Demand Response and Distribution Grid Operations: Opportunities and Challenges", IEEE Transactions on Smart Grid, vol. 1(2), Sep. 2010, pp. 193-198.

Phase Converter and Electric Motor Starting Currents, http://www.phaseconverterinfo.com/phaseconverter_motorstarting.htm.

Single-Phase Electric Motor Characteristics & Applications Apr. 19, 2011; http://www.clrwtr.com/Single-Phase-Electric-Motors-Characteristics-Applications.htm, pp. 1-4.

Open Automated Demand Response Communications Specification (Version 1.0), Pier Final Project Report, Apr. 2009, pp. ix-120, Figures APA-1 APD-66.

* cited by examiner

ADAPTIVE CONTROL OF POWER GRID OPERATIONS BASED ON ENERGY PROFILES

TECHNICAL FIELD

The present disclosure relates generally to power grids, and, more particularly, to control of power grid operations such as grid stabilization and/or management of demand responses on distribution feeder grids.

BACKGROUND

Electric power is generally transmitted from generation plants to end users (residential, commercial, and industrial (C&I), etc.) via a transmission and distribution grid consisting of a network of power stations, transmission circuits, and substations interconnected by powerlines. Once at the end users, electricity can be used as energy to power any number of devices. Controlling peak energy demand/consumption is beneficial to both utilities and to consumers. For instance, electrical utility companies design their systems, including generation, transmission, and distribution, to maintain grid stabilization and also to account for peak energy demand, which specifically often results in under-utilized systems for a vast majority of time.

A Demand Response (DR) system is a smart grid application mechanism generally designed to reduce power consumption, e.g., during peak hours. A utility or a service provider may issue a DR request to its customers asking them to turn off non-critical devices when power demand may exceed supply or when utilities may need to purchase power at a higher cost than the rate they are allowed to charge. Since utilities continuously balance energy demand with supply, DR can be viewed as complementary to energy generation and transmission capacity, as it provides utilities with a manner to control energy demand and bring it in line with the available power.

Generally, the end-device reaction to a DR request has been for each end-device to shut down (or reduce power), and then restart at a later, e.g., randomized, time. The response of end-devices in this manner, however, has limited intelligence, and may not be suitable for specific situations where greater control may be particularly beneficial and/or necessary.

Additionally, the transfer of alternating-current (AC) electric power to the end users most frequently takes the form of polyphase electric power, where, e.g., three voltage waveforms are produced that are generally equal in magnitude and 120° out of phase to each other. If the load on a three-phase system is balanced equally (enough) among the phases, little or no current flows through a neutral point, which is an important design aspect of the electric grid, allowing for efficient use of transformer capacity, reduced materials (e.g., size of a neutral conductor to handle imbalance), etc. However, there are many factors that may create imbalance and/or instability between the phases, such as unequal loads, excess load usage, faults, downed power-lines, etc.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
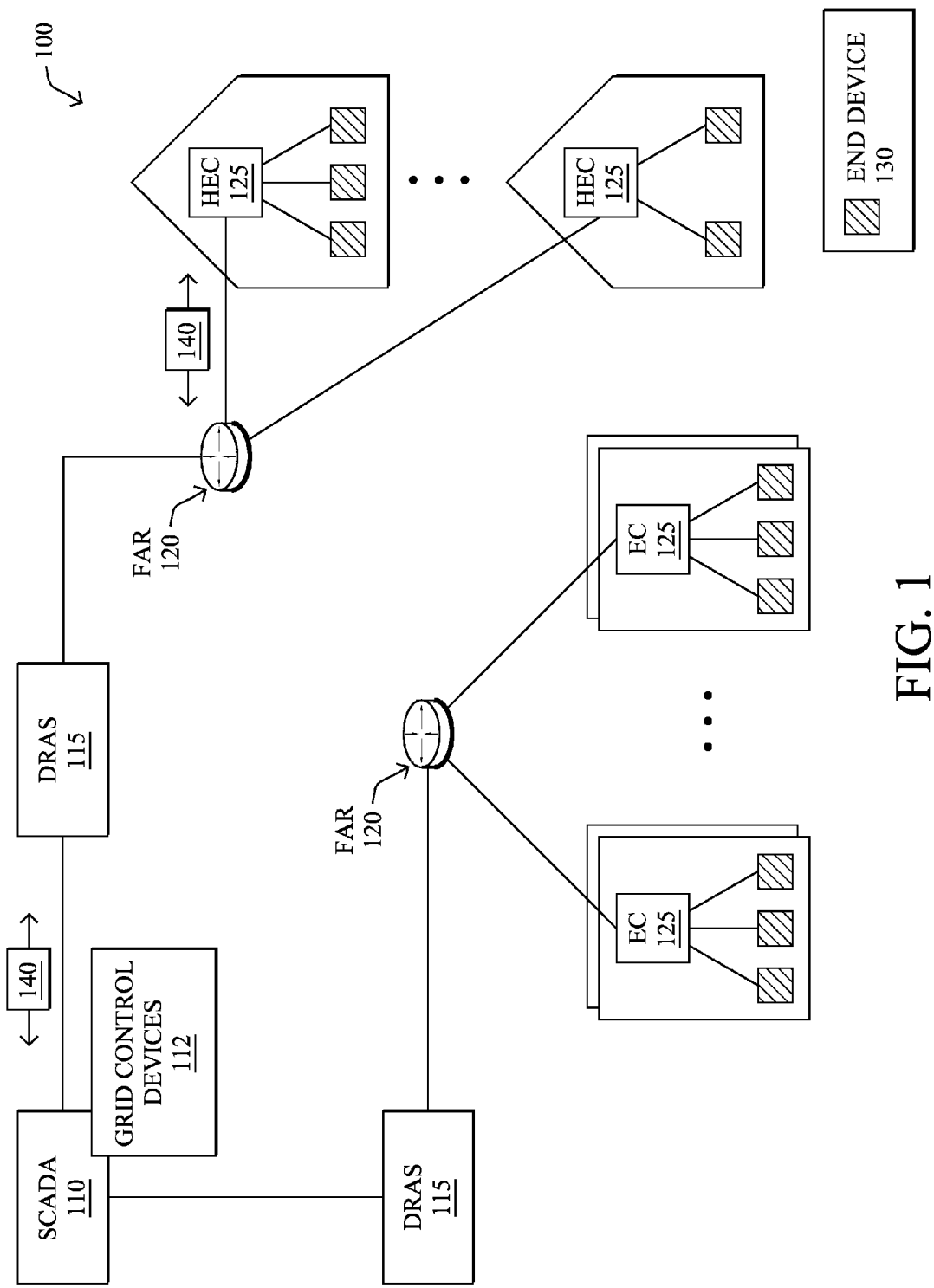
FIG. 1 illustrates an example computer network within a distribution portion of an electric power grid.

According to one or more embodiments of the disclosure, an energy manager determines respective energy profiles of one or more local end-devices for which the energy manager is responsible. Through communication between a power grid controller and the energy manager, one or more aspects of power grid operations may be controlled based on the communicating and the respective energy profiles. For example, in one embodiment, upon receiving a global demand response (DR) request, the energy manager determines respective specific DR command/control for the one or more local end-devices based on the received DR request and the respective energy profiles, and transmits the respective specific DR command/control to the one or more local end-devices, accordingly. In another embodiment, power grid operations may be stabilized based on the respective energy profiles.

Description

A computer network is a geographically distributed collection of nodes interconnected by communication links and segments for transporting data between end nodes, such as personal computers and workstations, or other devices, such as sensors, utility meters, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

Smart object networks, in particular, are a specific type of network having spatially distributed autonomous devices such as sensors, actuators, etc. For example, sensor/actuator networks, such as for "Smart Grid" and "Smart Cities," may cooperatively monitor and/or control physical or environmental conditions at different locations. For example, sensor networks may be used to monitor energy/power consumption, resource consumption, etc., while another type of smart object, actuators, may be responsible for turning on/off engine, opening/closing circuits, or perform any other actions. Generally, smart object networks may include any type of device that is able to communicate information on a computer network, such as household appliances (air conditioners, refrigerators, lights, etc.), industrial devices (heating, ventilating, and air conditioning (HVAC), pumps, motors, etc.), and other "smart" devices. Though not specifically discussed, those skilled in the art would recognize that this invention covers also objects which by themselves are not "smart" but by being integrated or connected via an adjunct proxy are able to communicate (convey information and receive control commands) with other smart elements of the network.

That is, smart object networks are typically interconnected by a communication network, such as a wireless network, though wired connections are also available, including, e.g., PLC communication. For instance, each smart device (node) in a smart object network may generally be equipped with a radio transceiver or other type of communication port, a microcontroller, and an energy source, such as a battery or a distribution grid power source. Typically, size and cost constraints on sensor nodes result in corresponding constraints on resources such as energy, memory, computational power and bandwidth.

FIG. 1 is a schematic block diagram of an example computer network 100 within a distribution portion of an electric power grid, illustratively comprising one or more field area networks (FANs) or neighborhood area networks (NANs). Those skilled in the art will understand that the view shown herein is for simplicity, and is not meant to limit the scope of the embodiments herein.

As shown, within each localized FAN/NAN is one or more energy consuming end-devices 130, such as lights, heaters, air conditioners, refrigerators, computers, industrial machinery, or other intelligent end devices (IEDs) of the distribution feeder circuit (which are attached to network 100). (It should be noted that the energy consuming end-device may physically reside inside or outside the building.) According to the embodiments herein, particular energy consuming end-devices 130 may communicate with one or more energy controllers 125 (e.g., home energy controller "HEC" or else simply an energy controller "EC"), such as a device located within a home or industry site that is configured to provide communication between the one or more end-devices 130 and the network 100, and to monitor, measure, and control the operation of devices 130. Note that where multiple energy controllers 125 exist within a single company/entity/campus, a network building manager (NBM) may be used to consolidate the information. For purposes of discussion herein, an NBM is a type of energy controller 125.

The network 100 may generally comprise a hybrid of communication modalities such as wireless mesh network, fiber network, PLC network, etc., or even a computer network such as the Internet. That is, the links between the devices may be wired links (e.g., for power-line communication or Ethernet communication), optical fiber network, or may comprise a wireless communication medium. In one or more embodiments, energy controllers 125 may communicate via a respective meter (not shown), which provides the power to the end locations in a conventional manner, in addition to providing metering functionality. In particular, in accordance with an illustrative embodiment, meters may also provide certain communication connectivity (e.g., wirelessly) to the network 100.

Illustratively, groups of "local" end-devices 130 communicate with the network (e.g., through controllers 125 and/or meters) via a field area router (FAR) 120 (also referred to as a FAN/NAN router), such as a pole-top router or other suitable communication device. In addition, a grid control device/system (also referred to as a Distribution Management System, or "DMS"), which may include a supervisory control and data acquisition (SCADA) device 110 or a substation computer, as well as one or more Demand Response automation servers (DRASs) 115 (also referred to as a Demand Response Management System or "DRMS") in certain embodiments, may be located within the network 100, and in communication with the intelligent end devices (IEDs) via illustrative FARs 120. Note that the SCADA 110 may also be configured to control one or more "grid control devices" 112, such as various electro-mechanical devices (energy storage, distribution static compensators or "DSTATCOMs," etc.) used to manage operability (e.g., balance, stability, power levels, etc.) within the underlying power grid of network 100. Note that while grid control devices 112 are shown co-located with SCADA 110, the devices 112 may actually be located in a separate physical location and connected by a communication link, accordingly.

Data packets 140 (e.g., traffic and/or control messages) may be exchanged among the nodes/devices of the network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other.

Those skilled in the art will understand that any number of nodes, devices, links, etc., as well as any different (and suitable) type of nodes, devices, links, etc., may be present in the network, and that the view shown herein is for simplicity and is not meant to limit the scope of the embodiments herein. In fact, those skilled in the art will appreciate that countless arrangements of power grid components and communicating devices may be established. Also, while FIG. 1 illustrates specific types of devices, such as SCADA 110, DRAS 115, FARs 120, and HECs 125, these devices as described herein may be given generic names, such as "power grid controller" (e.g., a component of a SCADA and/or a DRAS) or "energy manager" (e.g., a component of a FAR and/or an HEC).

Figure 2:
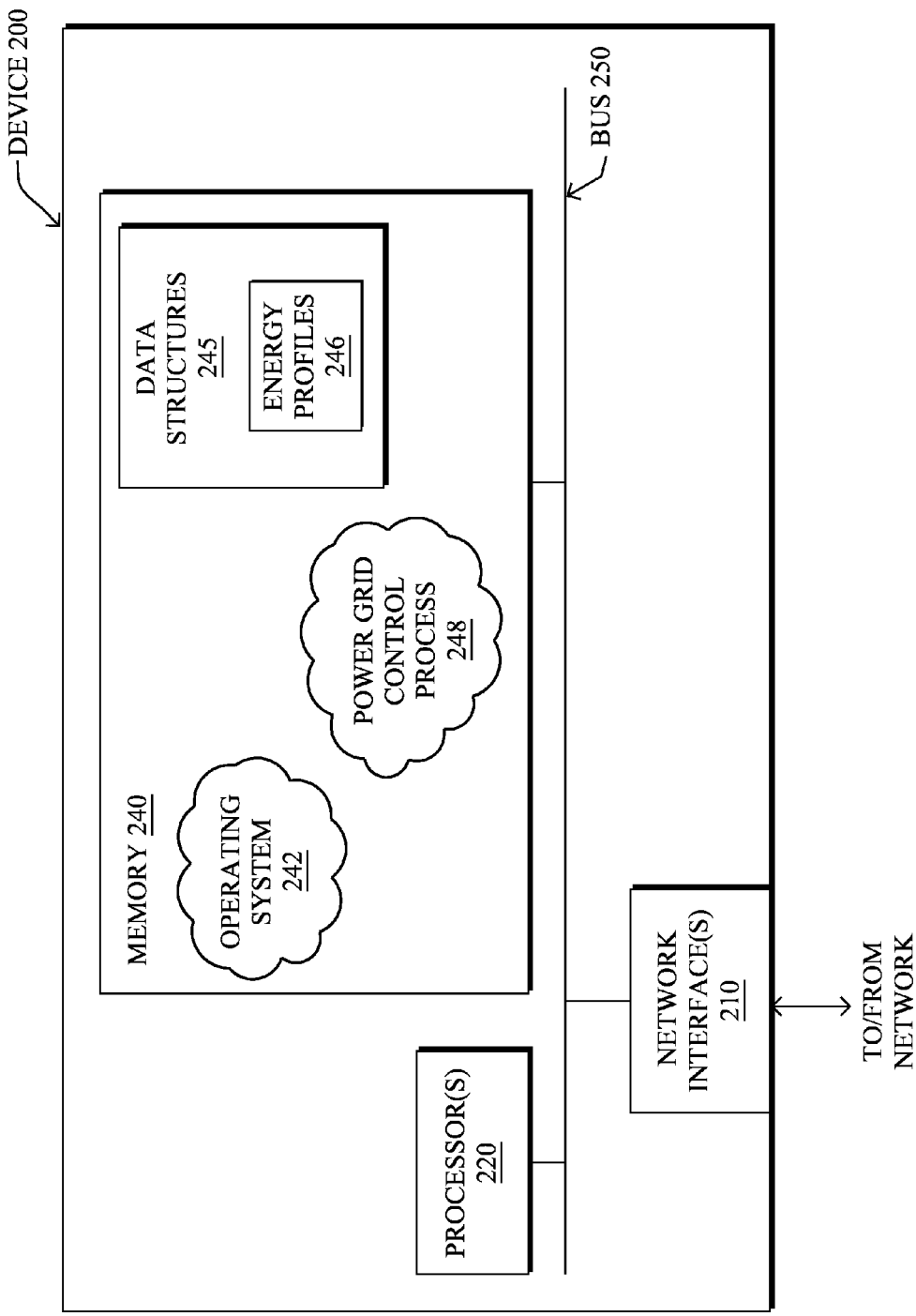
FIG. 2 illustrates an example device/node.

FIG. 2 is a schematic block diagram of an example device 200 that may be used with one or more embodiments described herein, e.g., as an energy manager device such as a FAR 120 (and/or DRAS 115 and HAN/HEC 125), a power grid controller such as SCADA 110, or else as an end-device 130. It should be noted that while FIG. 1 describes these network elements to be distinct entities, those skilled in the art should recognize that any of these elements can be combined without changing the scope of the embodiments herein. The device 200 may comprise, as a simple representation, a network interface 210, a processor 220, and a memory 240 interconnected by a system bus 250.

The network interface 210 contains the mechanical, electrical, and signaling circuitry for communicating data over physical and/or wireless links coupled to the network 100. The network interface may be configured to transmit and/or receive data using a variety of different communication protocols, including, inter alia, various wired or wireless protocols, powerline communication (PLC) protocols, broadband over power lines (BPL), fiber optic lines, etc. In particular, for an energy manager (e.g., FAR 120), the network interface is adapted to communicate with a plurality of local end-devices 130, and also with the SCADA 110 and optionally a DRAS 115 and/or one or more HAN/HEC 125 for use particularly as described herein. Note that an energy manager may also be in communication with other energy managers, as described below.

The memory 240 comprises a plurality of storage locations that are addressable by the processor 220 for storing software programs and data structures associated with the embodiments described herein. The processor 220 may comprise necessary elements or logic adapted to execute the software programs and access and/or manipulate the data structures 245, such as one or more energy profiles 246. An operating system 242, portions of which are typically resident in memory 240 and executed by the processor, functionally organizes the device by, inter alia, invoking operations in support of software processes and/or services executing on the device. These software processes and/or services may comprise an illustrative "power grid control" process 248, for use as described herein, as well as other processes not shown for clarity.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, electric power is generally transmitted from generation plants to end consumers (industries, commercial, residential, etc.) via a transmission and distribution grid consisting of a network of power stations and substations interconnected by transmission circuits/power lines. From the transmission grid, power may then be distributed to end consumers via a distribution system. Once at the end consumers, electricity can be used to power any number of devices, such as end-devices 130.

Consumption patterns have changed in recent times due to acquisition of new consuming devices such as large flat panel TVs, electric cars, etc., which have introduced new loads to the distribution grid. It is well known that the load presented by customers varies as a function of the time, date, temperature, etc. Additionally, however, distribution grid loads have further evolved from a relatively static/predictable pattern to an even more dynamic one (e.g., due to intermittent supply from distributed energy resources (DERs), introduction of electric cars, etc.).

In particular, the transfer of alternating-current (AC) electric power to the end users most frequently takes the form of poly-phase electric power, where, e.g., three voltage waveforms are produced that are generally equal in magnitude and 120° out of phase to each other. If the load on a three-phase system is balanced equally (enough) among the phases, little or no current flows through a neutral point, which is an important design aspect of the electric grid, allowing for efficient use of transformer capacity, reduced materials (e.g., size of a neutral conductor to handle imbalance), etc. However, there are many factors that may create imbalance and/or instability between the phases, such as unequal loads, excess load usage, faults, downed power-lines, etc., the stabilization of which being particular emphasized due to the recent evolution of the dynamic distribution grid.

Additionally, as further noted above, a Demand Response (DR) system is a smart grid application mechanism designed to reduce power consumption, e.g., during peak hours. A utility or a service provider (e.g., SCADA 110, or more particularly a DRAS/DRMS 115) may issue a DR request to its customers asking them to turn off non-critical devices 130 when power demand may exceed supply or when utilities may need to purchase power at a higher cost than the rate they are allowed to charge. Since utilities continuously balance energy demand with supply, DR can be viewed as complementary to energy generation and transmission capacity, as it provides utilities with a manner to control energy demand and bring it in line with the available power.

Generally, the end-device reaction to a DR request has been for each end-device to shut down (or reduce power), and then restart at a later, e.g., randomized, time. The response of end-devices in this manner, however, has limited intelligence, and may not be suitable for specific situations where greater control may be particularly beneficial and/or necessary.

For example, devices which respond to DR requests conventionally randomize the specific time they turn themselves off in order to smooth out the overall decrease in energy consumption. More particularly, when the DR time expires or when an explicit end of the DR is indicated by the utility, the system randomizes the specific time devices are turned on in order to smooth out the buildup of energy demand. The randomization of turning devices off (and then later on) works well for very large systems such as a large substation which supports a large number of consumers. However at the micro level of the distribution system where the number of attached devices is small, the randomization may not work properly. Specifically, at the end of a DR, the inrush current (e.g., to start motors of refrigerators, HVAC systems, etc.) may be much larger than the steady state current consumed by a specific device. For example, a typical full load amps (FLA) for a 230-volt, 10-HP three-phase motor is 29 A, and the starting (inrush) current is approximately 150 A. Other motors may develop even higher starting currents, e.g., approximately 700% to 1,000% of rated steady state current. When multiple devices start effectively at the same time, their combined inrush starting current may result in an a larger-than-normal load on the neighborhood transformer (or the transformer which serves multiple commercial and industrial (C&I) facilities), possibly even exceeding the transformer's specification.

This particular issue may be mitigated by increasing the length of the randomization window, but this has the side affect that customers may be asked to not consume energy longer than is absolutely required resulting in a reduced level of service to end-users, lower system efficiency, as well as reduced revenue for the utility.

Localized Demand Response Control

The techniques herein provide for adaptive localized control over demand responses (DRs). Specifically, according to one or more embodiments of the disclosure as described in greater detail below, an energy manager determines respective energy profiles of one or more local end-devices for which the energy manager is responsible. Through communication between a power grid controller and the energy manager, one or more aspects of power grid operations may be controlled based on the communicating and the respective energy profiles. For example, in one embodiment, upon receiving a global demand response (DR) request, the energy manager determines respective specific DR commands/control for the one or more local end-devices based on the received DR and the respective energy profiles of the corresponding energy consuming end-devices 130, and transmits the respective specific DR control to the one or more local end-devices, accordingly. In another embodiment, power grid operations may be stabilized based on the respective energy profiles.

Illustratively, the techniques described herein may be performed by hardware, software, and/or firmware, such as in accordance with power grid control process 248, which may contain computer executable instructions executed by the processor 220 to perform functions relating to the novel techniques described herein. For instance, depending upon the particular functionality being described, the application can work either in an energy manager device such as within a FAR 120 or energy controller 125, a power grid controller such as a SCADA 110 (e.g., and control device 112) or DRAS 115, or even within an end-device 130 to compute and/or receive the controls, accordingly.

Operationally, as described herein, the illustrative "power grid controller" (e.g., SCADA 110 and/or DRAS/DRMS 115) and "energy manager" (e.g., FAR 120) communicate with each other in order to relay Demand Responses and/or energy profiles. (Note that as described herein, a SCADA 110 and/or DRAS/DRMS 115 may control DR system operation; however, in certain embodiments, only the DRAS/DRMS 115 performs such functionality, as is often the case in many distribution grid topologies.) Accordingly, one or more aspects of power grid operations may be controlled based on the communicating and the respective energy profiles as described in greater detail below.

In accordance with one or more embodiments herein, control of power grid operations relates to management of Demand Responses. In particular, due to scale challenges, it is often not practical for a utility's Demand Response (DR) system to individually communicate with each end-device receiving its power. Therefore a conventional DR system relies on the large number of end-devices and requires that the end-devices randomize their responses. The techniques herein, however, act as an intermediary between the utility's DR system and the end-devices.

Figure 3A:
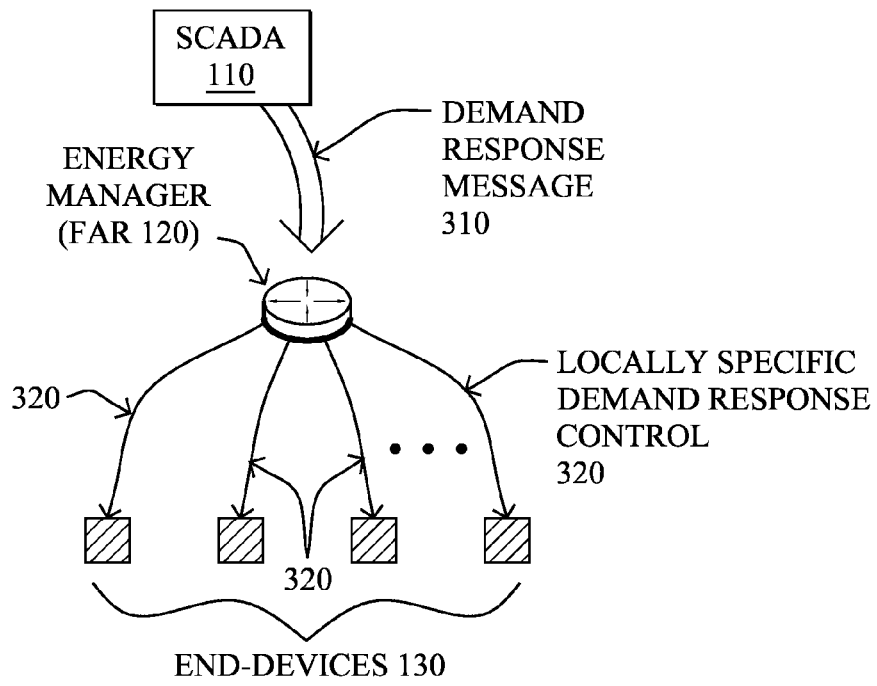
FIGS. 3A-3B illustrate example localized Demand Response control.

As illustrated in FIG. 3A, an energy manager (or "enhanced demand response application" or "EDRA" herein) in accordance with one or more illustrative embodiments herein allows a utility's DR system to issue a bulk or "global" DR request 310 to the masses of end-devices using multicast messages (thus facilitating the scaling of the utility DR system). The system described herein, and more specifically the energy manager (EDRA, e.g., a FAR 120), intercepts these DR messages 310, and as described below, coordinates the specifics of their implementation with end-devices 130 based on their published energy profiles to allow for greater localized control of the DR (specific DR control messages 320). For example, the coordination may be used to minimize the maximum inrush current inflicted on the distribution transformers when end-devices restart (or otherwise increase their energy consumption) upon conclusion of a Demand Response period.

According to the illustrative techniques herein, the FAN router (FAR 120) or a NAN router may be utilized as an intermediate computing point (energy manager) for locally controlling/modifying DR transitions. Prior to any DR event, the energy manager on the FAR 120 communicates with all of the facilities (end-devices 130) it controls, and obtains/determines the respective energy profiles of all local end-devices in the facilities it serves (i.e., those for which the FAR/energy manager is responsible), e.g., using an enhanced version of protocols such as the Open Automated Demand Response Communication Specification (version 1.0) or "OpenADR." Those skilled in the art should understand that the communication may be directly with the end devices, or with energy controllers which act as a proxy for the end devices. It should also be understood that devices may reside physically either within or outside the facilities.

Notably, end-device energy profiles may be obtained by the EDRA in several illustrative ways. In accordance with one embodiment for the consumer premise, an Energy Services Interface (ESI) can collect energy profiles from all devices attached to the consumer HAN (home area network), such as through communicating with a sub-local energy profile collector, e.g., HEC 125. The ESI may be further extended to provide the EDRA with a query capability for the list of end-device energy profiles collected by the ESI. In accordance with another embodiment, the ESI exposes a single consolidated HAN energy profile calculated from the set of energy profiles existing on the HAN. The latter approach provides increased scale. Said differently, the energy manager (e.g., FAR 120) may receive from the sub-local energy profile collector (e.g., HEC 125), the respective energy profiles of the one or more local end-devices 130 as individual energy profiles or as an aggregated energy profile from all of the end-devices serviced by the sub-local energy profile collector. For commercial and industrial premises, the illustrative OpenADR protocol defines how one or more Demand Response Automation System (DRAS) clients, located on the customer premise (e.g., on energy controllers 125), communicate with an energy service provider DRAS 115 to implement DR. In accordance with yet another specific embodiment the DRAS client entity may be extended to include a client energy profile.

Figure 3B:
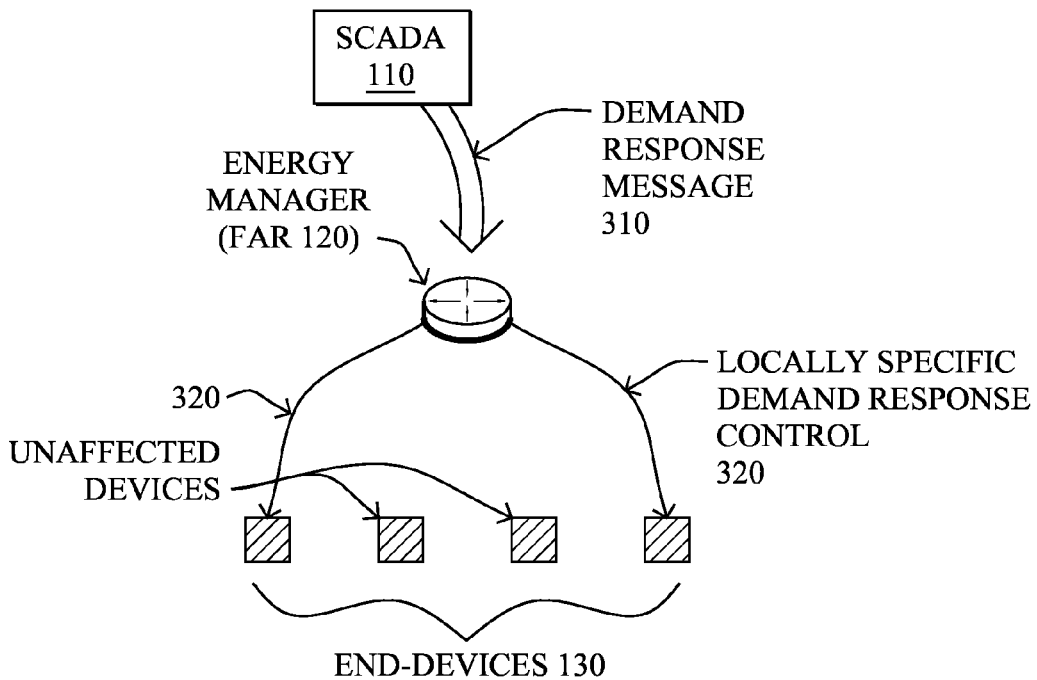

According to one or more embodiments described herein, the energy manager (e.g., FAR 120), having the energy profiles of its end-devices 130, may receive a global demand response (DR) 310, e.g., originated by SCADA 110 or DRAS 115 based on one or more energy-based triggers as will be appreciated by those skilled in the art. Based on the received DR 310, as well as the respective energy profiles of the local end-devices, the energy manager then determines and transmits respective specific DR control 320 for the one or more local end-devices. For example, the DR control may comprise reducing energy consumption of one or more particular end-devices of the local end-devices for a given length of time. As shown in FIG. 3B, for instance, the energy manager may determine a specific subset of local end-devices to receive the modified DR response 320, e.g., based on one or more features of the local end-devices, such as device priority (e.g., a dialysis machine), device type (e.g., air conditioner versus laptop), and device energy consumption (e.g., high efficiency refrigerator versus a non-efficient refrigerator), etc. Other options for specific (localized) DR control may comprise turning devices off completely, reducing energy consumption, turning devices on, ignoring the DR.

As a specific example, with existing random staggering algorithms, as soon as a DR scenario clears up, the power to two facilities which do not have any motors may be randomly (and unnecessarily) staggered. Similarly, every so often the power to two facilities which have a large reactive load may be turned on at the same time. In contrast, a system in accordance with the techniques herein may determine the specific characteristics of each load (if available) and may schedule (in a deterministic way) the specific startup sequence. In this manner, the system ensures that a DR period lasts as short a time as possible, e.g., without exposing distribution transformers to high inrush current which may reduce the lifespan of the devices.

In particular, in accordance with this illustrative embodiment, the EDRA (energy manager) may be associated with each specific distribution transformer (e.g., as a pole-top router/FAR 120) and may consequently construct a detailed plan for staggering the starting times of devices in multiple facilities which obtain power from a specific transformer. That is, the system may construct a plan for bringing online energy consuming devices after a DR period ends, with one illustrative intention being to minimize the peak of a consolidated inrush current at the end of a DR period. For instance, the EDRA may consolidate the energy profiles to obtain an estimated energy consumption profile for each transformer serving the facilities. In this manner, rather than relying on randomization (which works well for a large number of devices but performs poorly for a small sample), the EDRA thus calculates a deterministic offset for each device it controls such that the overall combined peak of the inrush starting current is minimized.

Note that in accordance with one or more embodiments of the techniques herein, when a utility issues a DR request 310, devices 130 may still use the existing method of randomizing the time they turn themselves off (or reduce power). This timing may be determined either by the device itself or by an energy manager. However when the utility issues an end of DR period message (or when the original DR message expires), rather than each device and/or each facility randomly deciding by itself when to turn on energy consuming devices (or increase energy consumption), a system in accordance with the techniques herein utilizes the EDRA to determine when a specific device should be turned on.

That is, as mentioned above, using the existing randomization timing for turning electricity on in various facilities, intermittently when two motors randomly select approximately the same starting time the neighborhood transformer may experience an instantaneous inrush current which approaches or even exceeds its rating resulting in a shorter device lifespan. Using a system in accordance with the techniques herein, the starting times of the various devices (which may be located in different facilities) feeding from the same distribution transformer are deterministically set by the EDRA. Consequently, devices which require a high inrush starting current are started at different times.

Figure 4:
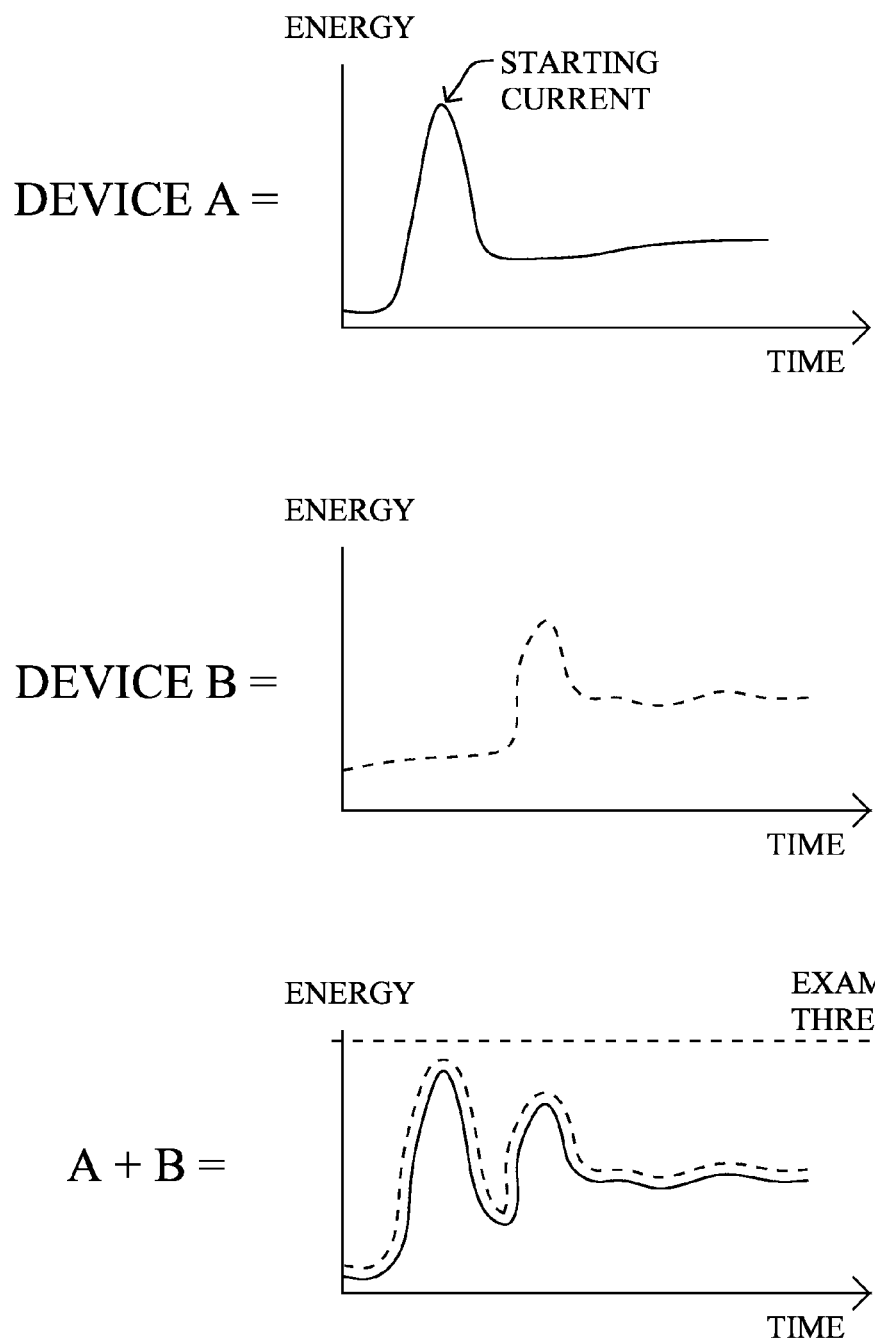
FIG. 4 illustrates example starting current distribution.

FIG. 4 illustrates an example of starting current distribution, with illustrative devices 130 labeled "A" and "B" within a FAN/NAN serviced by a particular FAR 120. Assuming that the energy manager determines based on the respective energy profiles 246 that device A is associated with a large inrush current at a first time, and device B is associated with a slightly smaller inrush current at a second later time, the energy manager may deterministically stagger the increase in power consumption to reduce a maximum shared overlap starting current among the one or more devices (A+B). For instance, in accordance with another aspect of the invention, particular devices having comparatively larger starting currents may be instructed to increase power consumption prior to other devices having comparatively lower starting current. In other words, devices requiring a large inrush starting current are started at the beginning of a turn on cycle (before the composite steady state current through the transformer increases) and as such, the maximum peak current through the transformer is also greatly reduced (e.g., maintained below an example threshold of design tolerances).

Note that the starting current of the devices may be determined based on one or more environmental conditions. For example, refrigerators whose temperature may be reaching a top temperature threshold may be started ahead of refrigerators whose temperature is well within their band of tolerance. Conversely, buildings which have marginal air quality may have their ventilation system started ahead of buildings which have marginal air quality but still within tolerance, etc.

Figure 5A:
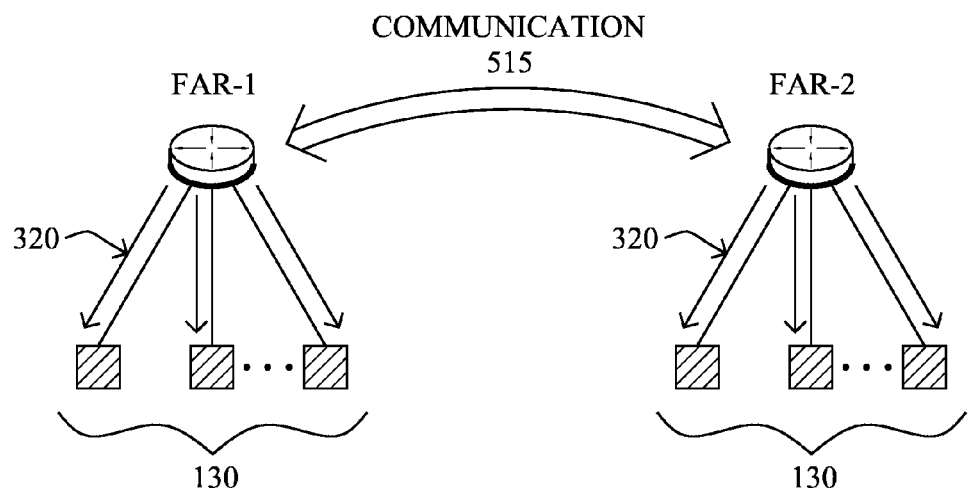
FIGS. 5A-5B illustrate example communication relationships between energy managers.

Note further that in certain embodiments, EDRA applications on neighboring energy manager devices (e.g., FARs 120) may further communicate to ensure that critical energy consuming devices are powered first. For instance, as shown in FIG. 5A, the communication between neighboring energy managers having correspondingly local end-devices is shown with energy managers FAR-1 and FAR-2. In particular, FAR-1 and FAR-2 may coordinate the starting times of multiple end-devices 130 in a larger area so as to minimize the impact of inrush current to substation transformers.

Figure 5B:
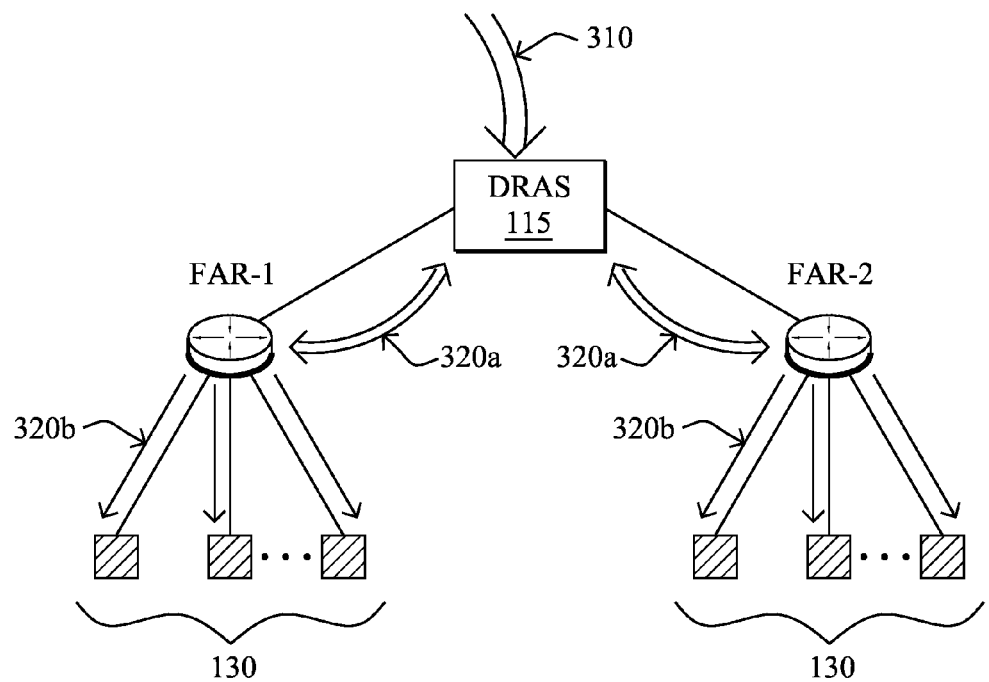

In still another embodiment, to improve scale and as shown in FIG. 5B, a hierarchy of EDRAs may be supported in which a child energy device (for example, a premise energy controller 125) provides a single consolidated energy profile to its upstream parent energy manager (e.g., FAR 120). Also, the parent energy manager may in turn provide a consolidated energy profile for its upstream parent energy manager, e.g., on a substation DRAS 115. Note that in this embodiment, a global DR 310 may be received at a DRAS 115, and a local energy manager application (grid control process 248) may modify the global DR 310 into first locally specific DR messages 320A to the FARs, which may then further modify the DRs 320A into more narrowly local messages 320B in a hierarchical manner, accordingly. As an example, the modification of DRs with this much visibility of energy profiles and distributed information may be used to minimize technical loss on the distribution feeder circuit. That is, generally, the further from a substation an end-device is located, the more power is actually drawn from the substation to produce the same amount of end-device energy as would a closer end-device require. Accordingly, the modified DR may be able to request that only the furthest devices reduce their energy consumption, as such a selected subset may be more helpful to reduce overall energy use at the substation than any randomly selected subset of devices. (Note that to be "fair" to those devices located furthest away, the DRs may be based on other algorithms that distribute the subset in a less dramatic manner.)

In accordance with one or more additional embodiments herein, control of power grid operations may also relate to stabilizing power grid operations based on the respective energy profiles. In particular, as an alternative to or in addition to the intercepting and modifying of DRs 310, the energy managers (e.g., FARs 120) may communicate the respective energy profiles to the power grid controller (e.g., SCADA 110), wherein the power grid controller is configured to stabilize power grid operations based on the respective energy profiles (e.g., using DRs and/or by instructing grid control devices 112).

Specifically, in the embodiments herein, supplied electricity is most often part of a polyphase source system, where a plurality of phases (e.g., three) are transmitted onto powerlines to the end-devices 130, such that each device is generally attached to a particular phase of the electric grid. Notably, each phase may generally be used to power entire buildings, neighborhoods, etc., and may also supply power to many (e.g., tens, hundreds, thousands) of devices within those establishments. Similarly, in other topologies, a specific device may be attached to multiple (e.g., two or three) phases.

Figure 6B:
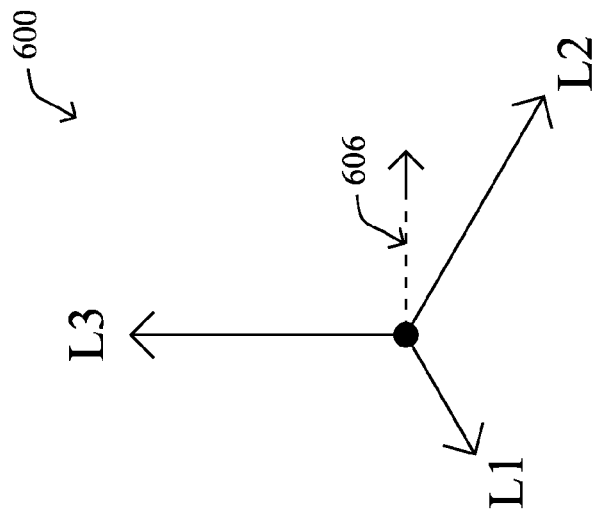
FIGS. 6A-B illustrate example phase representations of a polyphase electric distribution system.
Figure 6A:
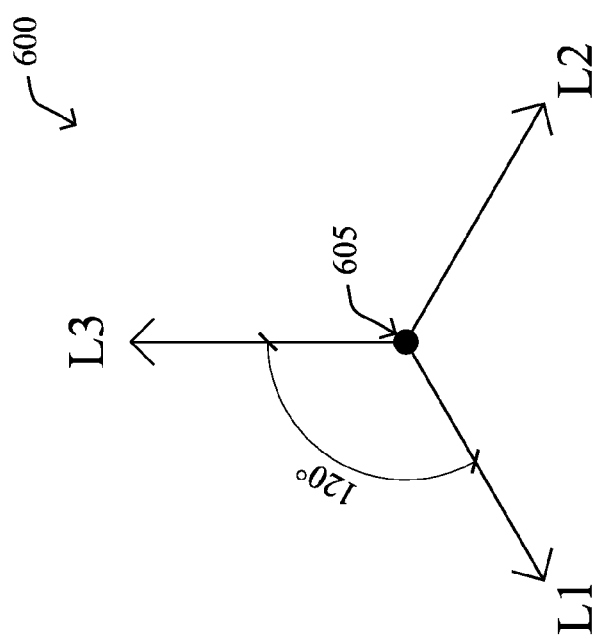

FIG. 6A illustrates an example phase representation 600 of the distribution grid's electrical power. In particular, three current waveforms are illustratively produced (L1, L2, and L3) that are generally equal in magnitude and approximately 120° out of phase to each other. The currents returning from the end users to the supply transformer all share the neutral wire (neutral point 605). If the loads are evenly distributed on all three phases, as they are in FIG. 6A, the sum of the returning currents in the neutral wire is approximately zero. Any unbalanced phase loading such as in FIG. 6B, however, may result in a current 606 at the neutral point, which may cause inefficient use of transformers, vibrations in generators, or other problems, including (but not limited to) brown-outs or black-outs in extreme cases. (Note that generally, overload of the neutral is a more frequent occurrence, resulting in heating of the neutral, since normally, the substation relay on that circuit should detect negative sequence or zero sequence over-current and trip long before any impact on generators is felt.) There are many factors that may create imbalance between the phases, such as excess load usage, downed power lines, etc.

Though the topology of the electric distribution grid typically considers the approximate balancing of the three-phase system, and other stabilization factors of the distribution grid in general, the dynamic nature of energy utilization may result in destabilization of the grid. For instance, hidden couplings and/or hidden feed-back loops may be created within a grid that may result in instability, whether transient or not, that may cause black-outs or over-voltage conditions (e.g., "violations"). By using the obtained energy profiles from the end-devices 130, a distributed control system may thus be established in support of grid stabilization. For example, the DMS may obtain the energy profiles, and based thereon, may instruct grid control devices 112 and/or may send DR commands 310 in a specific manner to help stabilize the grid, such as controlling static synchronous compensators (DSTATCOMs) in a particular manner, placing more load in one location and/or less in another location, etc. Essentially, any suitable control for stabilization and regulation of the power grid may be performed herein based on the distributed collection of energy profiles from end-devices 130, which may be hierarchically aggregated to allow for better scalability and lower technical losses.

Figure 7:
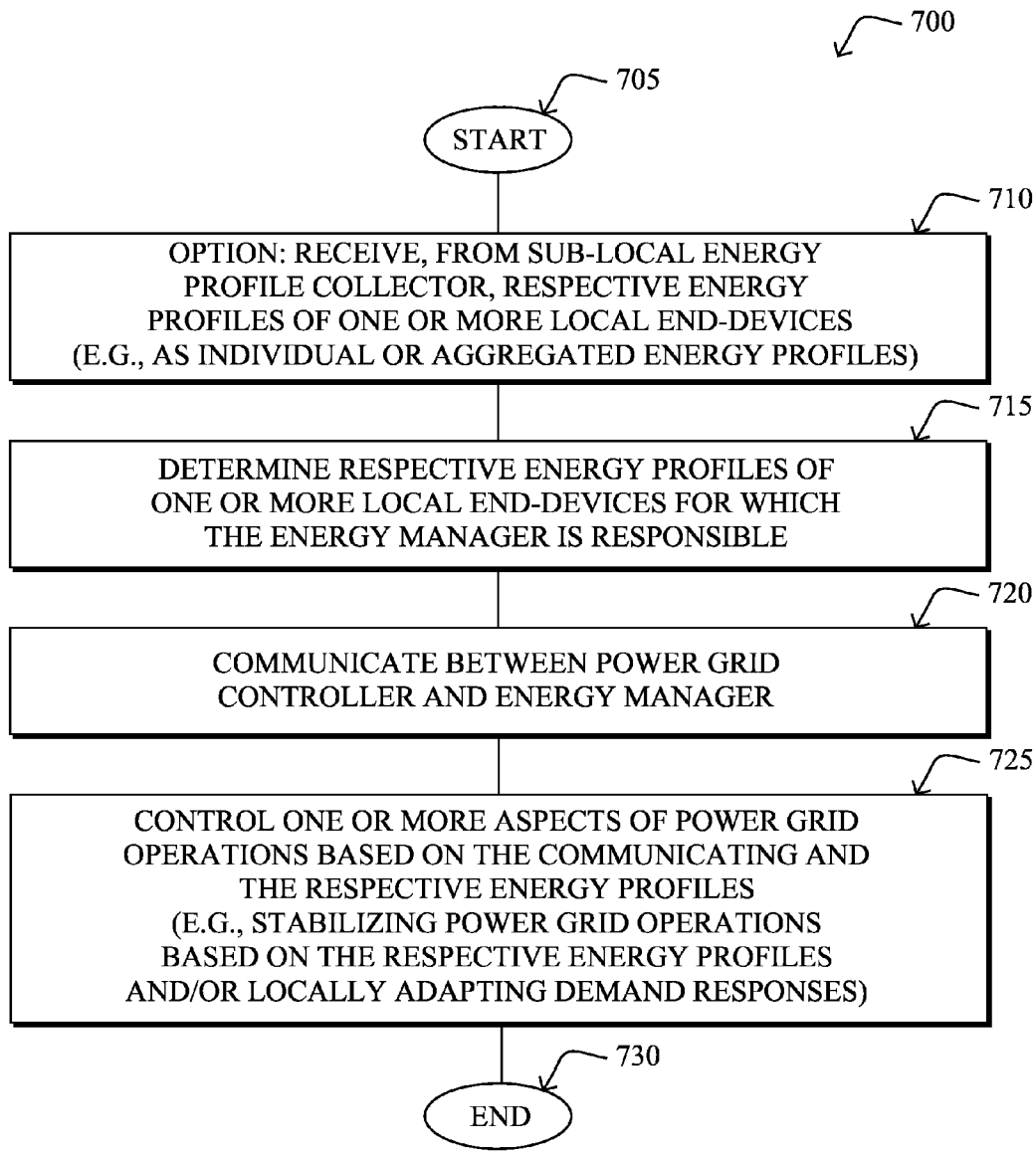
FIG. 7 illustrates an example simplified procedure for adaptive control of power grid operations in accordance with one or more embodiments described herein.

FIG. 7 illustrates an example simplified procedure for adaptive control of power grid operations in accordance with one or more embodiments described herein, e.g., generally from the perspective of the energy manager (e.g., FAR 120). The procedure 700 starts at step 705, and continues to step 710, where, as described in greater detail above, the energy manager may optionally receive respective energy profiles of one or more local end-devices 130 (e.g., as individual or aggregated energy profiles) from a sub-local energy profile collector (e.g., HAN/HEC 125), and in step 715 thus determines respective energy profiles of the local end-devices for which the energy manager is responsible. As described herein, in step 720, the energy manager and power grid controller communicate, e.g., to send energy profiles to the power grid controller for stabilization control and/or to receive Demand Responses as detailed in FIG. 8 below. Accordingly, in step 725, one or more aspects of power grid operations may be controlled based on the communicating and the respective energy profiles, such as stabilizing power grid operations based on the respective energy profiles and/or locally adapting demand responses. The simplified illustrative procedure 700 then ends in step 730.

Figure 8:
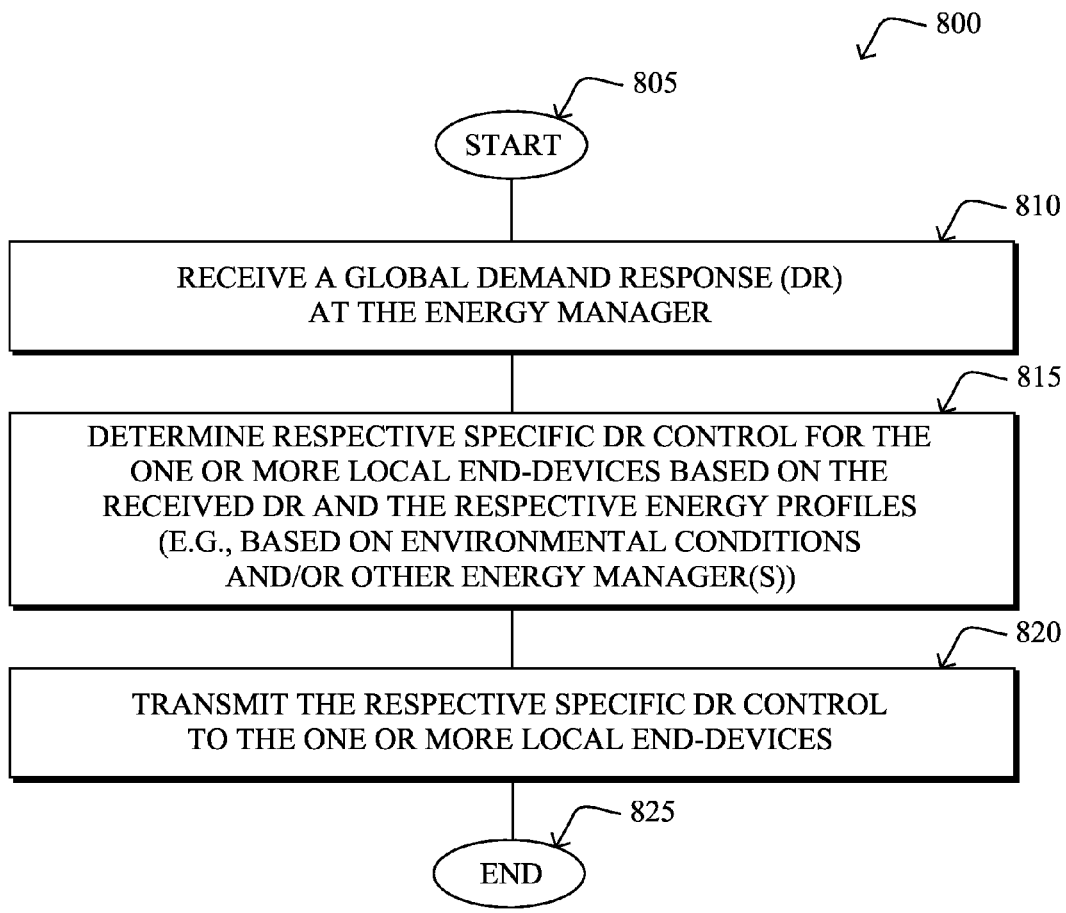
FIG. 8 illustrates an example simplified procedure for localized adaptive control of Demand Responses in accordance with one or more embodiments described herein, e.g., from the perspective of the energy manager.

FIG. 8 illustrates an example simplified procedure for localized adaptive control of Demand Responses in accordance with one or more embodiments described herein, e.g., from the perspective of the energy manager (e.g., FAR 120). The procedure 800 starts at step 805, and continues to step 810, where, as described in greater detail above, upon receiving a global demand response (DR) 310, the energy manager in step 815 determines the respective specific DR control for the one or more local end-devices based on the received DR and the respective energy profiles, as described in detail above. For example, the determination may be based on the peak starting current, priority/type of end-devices, environmental conditions, and/or based on communication with other energy manager(s), accordingly. In step 820, the energy manager transmits the respective specific DR control 320 to the one or more local end-devices, and the illustrative procedure 800 ends in step 825.

Figure 9:
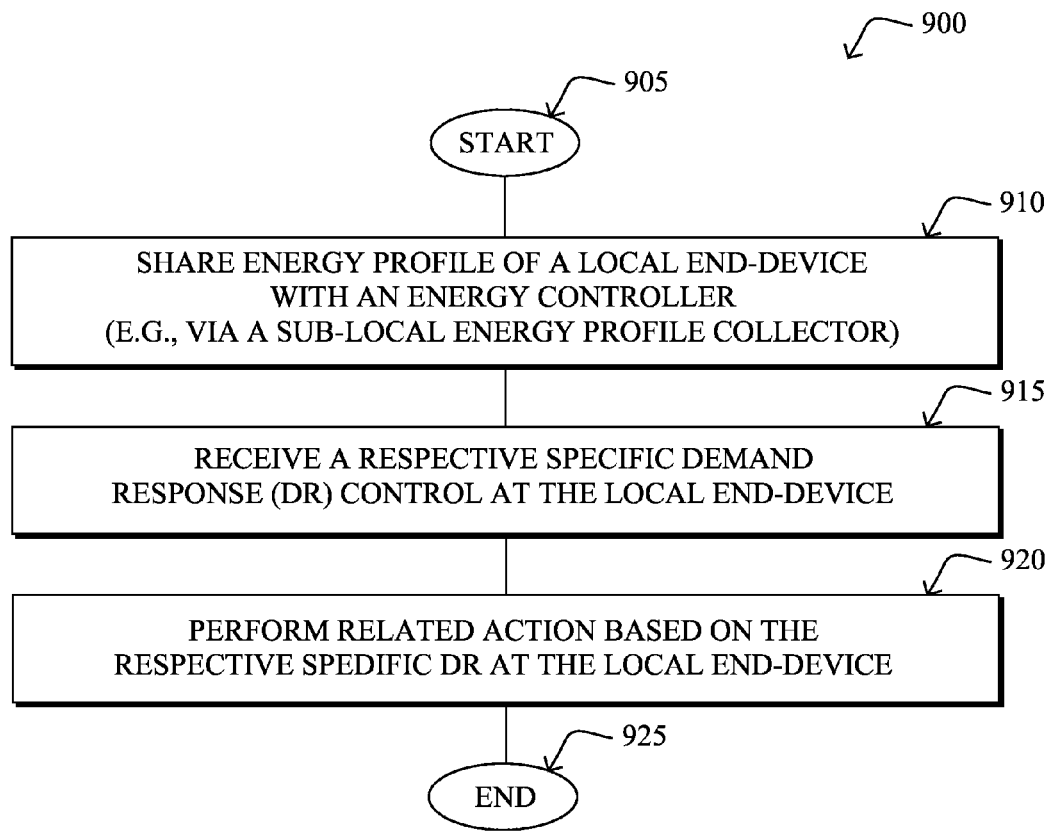
FIG. 9 illustrates another example simplified procedure for localized adaptive control of Demand Responses in accordance with one or more embodiments described herein, e.g., from the perspective of the end-devices.

In addition, FIG. 9 illustrates an example simplified procedure for localized adaptive control of Demand Responses in accordance with one or more embodiments described herein, e.g., from the perspective of the end-devices 130. The procedure 900 starts at step 905, and continues to step 910, where, as described in greater detail above, a particular end-device shares its energy profile with an energy controller (e.g., FAR 120), for example, via a sub-local energy profile collector (e.g., HAN/HEC 125). At some point later, in step 915 the end-device may receive a respective specific DR control 320, and, accordingly, performs the related action based on the respective specific DR in step 920 as detailed above. The illustrative procedure 900 ends in step 925, notably with the ability to return to step 910 to update the associated energy profile, or else to step 915 to receive future specific DR controls 320.

It should be noted that while certain steps within procedures 700-900 may be optional as described above, the steps shown in FIGS. 7-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-900 are described separately, certain steps from each procedure may be incorporated into each other procedure, and the procedures are not meant to be mutually exclusive.

The novel techniques described herein, therefore, provide for adaptive control of power grid operations, such as grid stabilization and/or localized control of Demand Responses. In particular, the novel techniques provide for optimal grid operation based on adaptive and local energy profiles, such as by taking a global DR, and "modifying" it to produce specific controls for local devices, accordingly, or else by utilizing the energy profiles to control various stabilization functionality. That is, the techniques above provide functionality that would be difficult, if not practically impossible, to perform manually, such as the adaptive reconfiguration of control based on changing profiles (added/removed devices, environmental conditions, topology changes, etc.), which is each critical for large scale deployments. Specifically, a system in accordance with the techniques herein utilizes the energy profiles it collects from its local devices to intelligently control the local devices (e.g., by intercepting and modifying DR requests) and and/or grid controllers (e.g., for stabilization).

For instance, in certain embodiments, the techniques herein take advantage of the information from energy profiles and change the existing paradigm for responding to DR requests. For example, in an illustrative embodiment, the techniques change conventional random staggering of the power-on of devices to a deterministic staggering optimized for the specific characteristics of the consuming devices and facilities. In this manner, the intelligent control may smooth out a combined inrush starting current at the end of a DR period, thus minimizing the peak of the inrush current, and extending the lifespan of distribution transformers. In addition, to prolonging the life of the equipment, the techniques herein may restore power to at least certain customers (and possibly all customers) in the shortest amount of time, improving customer satisfaction and increasing utility revenue.

While there have been shown and described illustrative embodiments that provide for adaptive control of power grid operations, it is to be understood that various other adaptations and modifications may be made within the spirit and scope of the embodiments herein. For example, the embodiments have been shown and described herein with relation to particular examples, such as grid stabilization and/or transformer life span protection (e.g., reducing peak spikes caused by combined inrush starting current at the end of a DR period. However, the embodiments in their broader sense are not as limited, and may, in fact, be used for other purposes, such as those described above (e.g., reducing overall power consumption, avoiding the shut-down of priority devices, etc.), as well as for the general benefit of other grid elements. Also, while the embodiments above may generally describe certain communication protocols (e.g., wireless and/or PLC), other protocols may be used, accordingly. In addition, while the techniques above make reference to distribution systems in particular, the disclosure herein may be applicable to both the transmission and distribution portions of the electric power grid.

Note also that while the above description suggests that an EDRA intercepts a global DR command 310 such that the end-devices do not receive the global DR command, in one or more embodiments herein, such a global DR request may be allowed to reach the end-devices. In this manner, the end-devices may act on those command while the EDRA calculates its modified commands (DR messages 320).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at an energy manager on a router, respective energy profiles of one or more local end-devices for which the energy manager is responsible, wherein the energy profiles are received from one or more respective energy controllers responsible for sub-local networks of the local end devices;
determining, by the energy manager, respective energy profiles of the one or more local end-devices, wherein the energy profiles comprise startup current profiles of the one or more end-devices;
receiving a global demand response (DR) request from a power grid controller at the energy manager;
determining respective specific DR control for the one or more local end-devices based on the received DR request and the respective energy profiles;
staggering end times for the respective specific DR control based on the startup current profiles of the one or more end-devices, wherein the end times are staggered such that an inrush current to a substation transformer that is attributable to the one or more end-devices returning to normal power consumption is minimized; and
transmitting the respective specific DR control to the one or more local end-devices.

2. The method as in claim 1, wherein the specific DR control comprises a deterministic offset time to respond to the global DR request.

3. The method as in claim 2, wherein responding to the global DR request by a particular local end-device comprises one of either reducing power consumption or increasing power consumption.

4. The method as in claim 3, wherein staggering the end times for the respective specific DR control comprises:
deterministically staggering the increasing power consumption by the particular local end-device to reduce a maximum shared overlap starting current among the one or more devices.

5. The method as in claim 4, further comprising:
instructing particular devices having comparatively larger starting current to increase power consumption prior to other devices having comparatively lower starting current.

6. The method as in claim 1, wherein the startup current profiles are based on one or more environmental conditions.

7. The method as in claim 1, wherein determining respective specific DR control comprises:
reducing energy consumption of one or more particular end-devices of the local end-devices for a given length of time.

8. The method as in claim 1, wherein determining respective specific DR control comprises:
determining a subset of one or more particular end-devices of the local end-devices to respond to the DR request.

9. The method as in claim 8, wherein determining the subset is based on one or more features of the local end-devices selected from a group consisting of: device priority; device type; and device energy consumption.

10. The method as in claim 1, further comprising:
communicating, by the energy manager, with a sub-local energy profile collector; and
receiving, from the sub-local energy profile collector, the respective energy profiles of the one or more local end-devices as one of either individual energy profiles or an aggregated energy profile.

11. The method as in claim 1, further comprising:
communicating, by the energy manager, with a second energy manager; and
further determining the respective specific DR control based on the communicating.

12. The method as in claim 11, wherein the second energy manager is one of either a neighboring energy manager having correspondingly local second end-devices or a hierarchically related energy manager.

13. The method as in claim 1, wherein controlling comprises:
stabilizing power grid operations based on the respective energy profiles.

14. The method as in claim 13, further comprising:
communicating the respective energy profiles from the energy manager to the power grid controller, wherein the power grid controller is configured to stabilize power grid operations based on the respective energy profiles.

15. An apparatus, comprising:
a processor adapted to execute one or more processes;
a network interface adapted to communicate as an energy manager with respective energy controllers responsible for sub-local networks of local end-devices for which the energy manager is responsible and also with a power grid controller; and a memory configured to store a process executable by the processor, the process when executed operable to:
receive respective energy profiles of the local end-devices from the one or more respective energy controllers responsible for the local end-devices;
determine the respective energy profiles of the one or more local end-devices, wherein the energy profiles comprise startup current profiles of the one or more end-devices;
receive a global demand response (DR) request from a power grid controller;
determine respective specific DR control for the one or more local end-devices based on the received DR request and the respective energy profiles;
stagger end times for the respective specific DR control based on the startup current profiles for the one or more end-devices, wherein the end times are staggered such that an inrush current to a substation transformer that is attributable to the one or more end-devices returning to normal power consumption is minimized; and
transmit the respective specific DR control to the one or more local end-devices.

16. The apparatus as in claim 15, wherein the process when executed is further operable to:
communicate with a sub-local energy profile collector; and
receive, from the sub-local energy profile collector, the respective energy profiles of the one or more local end-devices.

17. The apparatus as in claim 15, wherein the specific DR control comprises a deterministic offset time to respond to the global DR request.

18. The apparatus as in claim 15, wherein the process when executed is further operable to:
communicate with a second energy manager selected from a neighboring energy manager having correspondingly local second end-devices and a hierarchically related energy manager; and
further determine the respective specific DR control based on the communication.

19. The apparatus as in claim 15, wherein the process when executed to determine respective specific DR control is further operable to:
determine a subset of one or more particular end-devices of the local end-devices to respond to the DR request.

20. The apparatus as in claim 15, wherein the process when executed is further operable to:
communicate the respective energy profiles to the power grid controller, wherein the power grid controller is configured to stabilize power grid operations based on the respective energy profiles.

21. A tangible, non-transitory, computer-readable media having software encoded thereon, the software when executed by a processor on an energy manager on a router configured to:
receive respective energy profiles of the local end-devices from the one or more respective energy controllers responsible for the local end-devices at the energy manager on the router;
determine the respective energy profiles of the local end-devices for which the energy manager is responsible, wherein the energy profiles comprise startup current profiles of the one or more end-devices;
receive a global demand response (DR) request from a power grid controller; determine respective specific DR control for the one or more local end-devices based on the received DR request and the respective energy profiles;
stagger end times for the respective specific DR control based on the startup current profiles of the one or more end-devices, wherein the end times are staggered such that an inrush current to a substation transformer that is attributable to the one or more end-devices returning to normal power consumption is minimized; and
transmit the respective specific DR control to the one or more local end-devices.

22. The computer-readable media as in claim 21, wherein the software when executed is further operable to:
communicate the respective energy profiles to the power grid controller, wherein the power grid controller is configured to stabilize power grid operations based on the respective energy profiles.

\* \* \* \* \*